(12) United States Patent
Siraky et al.

(10) Patent No.: US 6,310,455 B1
(45) Date of Patent: Oct. 30, 2001

(54) POSITIONING AND ACTUATING DRIVE

(75) Inventors: Josef Siraky; Siegfried Held, both of Donaueschingen (DE)

(73) Assignee: Max Stegmann GmbH Antriebstechnik-Elektronik, Donaueschingen (DE)

( * ) Notice: Subject to any disclaimer, the term of this patent is extended or adjusted under 35 U.S.C. 154(b) by 0 days.

(21) Appl. No.: 09/552,223

(22) Filed: Apr. 19, 2000

(30) Foreign Application Priority Data

Apr. 19, 1999 (DE) .......................... 299 06 804 U

(51) Int. Cl.[7] .............. H02P 1/54; H02K 7/06; H02K 11/00
(52) U.S. Cl. .............. 318/560; 318/38; 318/40; 310/80; 74/89.15; 74/640
(58) Field of Search .............. 318/138, 38, 436, 318/430, 490, 685, 568.1; 364/424.046; 74/89.15, 640; 310/80; 188/299, 71.5; 280/707

(56) References Cited

U.S. PATENT DOCUMENTS

| | | | |
|---|---|---|---|
| 4,289,996 | * | 9/1981 | Barnes et al. . |
| 4,467,250 | * | 8/1984 | Thomasson . |
| 4,794,314 | * | 12/1988 | Janu et al. . |
| 5,396,973 | * | 3/1995 | Schwemmer et al. . |
| 5,496,102 | * | 3/1996 | Dimatteo et al. . |
| 5,557,154 | * | 9/1996 | Erhart . |
| 5,634,373 | * | 6/1997 | Cuffe et al. . |
| 5,656,903 | * | 8/1997 | Shui et al. . |
| 5,696,677 | * | 12/1997 | Leaphart et al. . |
| 6,003,640 | * | 12/1999 | Ralea . |

* cited by examiner

Primary Examiner—Paul Ip
(74) Attorney, Agent, or Firm—Hutchins, Wheeler & Dittmar

(57) ABSTRACT

An electric motor, gearbox, position phase angle sensor and motor phase angle sensor are integrated in a common housing to reduce the size of a positioning and actuating system. The housing also includes electronics for detecting and processing the signals from the phase angle sensors. The rotor shaft of the electric motor is designed to be hollow, and the drive shaft is mounted coaxially. The output shaft passing coaxially through the gearbox, and the end of the shaft which protrudes from the gear box is provided with a coupling. The drive shaft passes coaxially through the rotor of the electric motor and carries a position phase angle sensor at the end of the electric motor opposite the gear box. The motor phase angle sensor on the rotor shaft coaxially encloses the position phase angle sensor. The scanning detectors of both sensors are arranged on a common circuit board, which also carries the electronics for detecting and processing the signals of these sensors. Thus the phase angle sensors and electronics can be compactly mounted in the housing. A second circuit board, carrying the control and power electronics can be integrated parallel to the circuit board carrying the sensors. Both circuit boards are arranged perpendicular to the axis of the rotor and output shafts, the circuit boards add little to the overall dimensions of the housing.

20 Claims, 1 Drawing Sheet

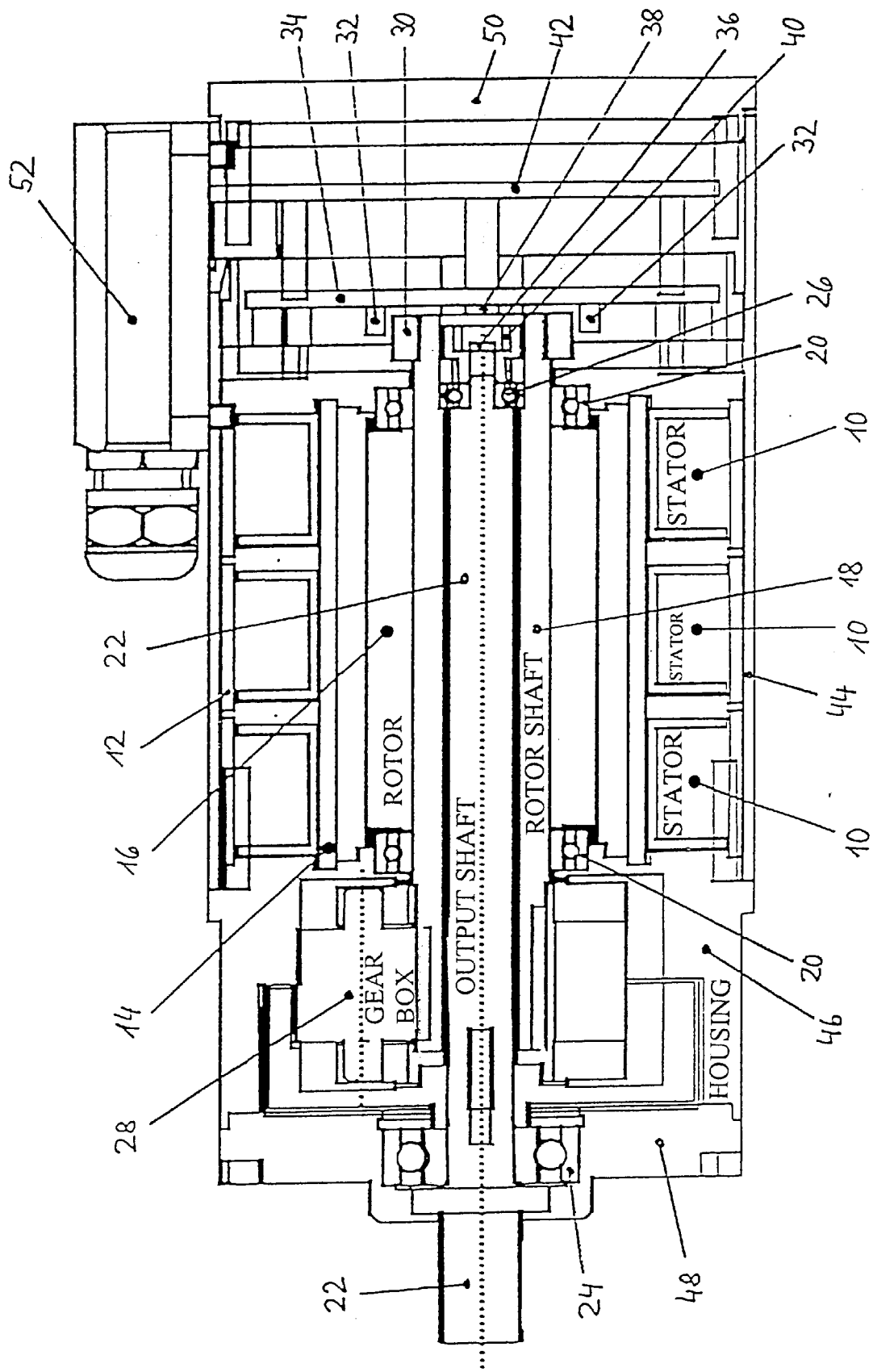

POSITIONING AND ACTUATING DRIVE

BACKGROUND OF THE INVENTION

1. Field of the Invention

The invention relates to a positioning and actuating drive.

2. Description of Related Art

Positioning and actuating drives are used in different industries for adjusting and positioning movable parts with respect to one another. Applications of such positioning and actuating drives include, for example, input feed axes and format adjustment devices in printing presses and textile machinery, woodworking machinery, packaging machines, bakery equipment, wrapping and labeling machines, as well as handling devices and attachments upstream and downstream from these machines.

Such positioning and actuating drives typically have an electric motor, which often drives an output shaft via a gear box, the output shaft being responsible for the positioning and actuating effect. A position phase angle sensor is coupled to the output shaft and generates position feedback and, optionally, velocity and/or acceleration feedback. If a direct current (i.e., DC) motor is used, typically a motor phase angle sensor is used to determine the rotor position of the motor for commutating and energizing the motor windings. The electric motor, the gearbox, and the phase angle sensor make the positioning and actuating drive occupy a large amount of space.

Thus there exists a problem in the art with the size of positioning and actuating drives. It would be desirable to provide a compact positioning and actuating drive in order to decrease the required volume, and thus increase the opportunity for incorporating or installing the positioning and actuating drive.

SUMMARY OF THE INVENTION

According to an embodiment of the present invention, a positioning and actuating drive has the features of a DC motor, which has a stator and a rotor rotatably mounted coaxially in the stator. A rotor shaft of the rotor is designed as a hollow shaft, and has an output shaft rotatably mounted coaxially in the rotor shaft. A gear box which drivingly connects the rotor shaft to the output shaft is arranged at the first end face of the electric motor, and the output shaft protruding outward from the rotor shaft and the gear box at this first end face. A position phase angle sensor and a motor phase angle sensor are arranged at the opposite second end face of the electric motor. The position phase angle sensor has a position phase angle sensing unit mounted on the output shaft and a fixed position phase angle sensor. The motor phase angle sensor has a motor phase angle sensing unit mounted on the rotor shaft and a fixed motor phase angle sensor. Electronics for detecting and processing the signals from the position phase angle sensor and of the phase angle sensor may be included in a housing, which encloses the electric motor, the gear box, the position phase angle sensor, the motor phase angle sensor, and the electronics. The output shaft may protrude at its end face.

Another embodiment of the invention provides a positioning and actuating drive where the position phase angle sensor includes a positioning magnet mounted on the end of the output shaft and a magnetoresisitive sensor disposed on a circuit board.

Another embodiment of the invention provides a positioning and actuating drive where the motor phase angle sensor has a ring magnet mounted on the end face end of the rotor shaft and at least one Hall sensor mounted on a circuit board.

In yet another embodiment of the invention, the gear box is a tooth-coupled gear, which engages the peripheral teeth of an end section of the rotor shaft protruding from the rotor and the peripheral teeth of a section of the output shaft protruding from the rotor shaft.

In still another embodiment of the invention, the housing includes a housing block, a housing tube and covers that seal the housing at both ends. The housing tube accommodates the electric motor, the position phase angle sensor, the motor phase angle sensor and the respective electronics, while the housing block accommodates the gear box.

In a further embodiment of the invention, the housing block has a pot-shaped design with its bottom adjacent to the housing tube and sealed at its open end by a cover.

In yet a further embodiment of the invention, the housing tube axially protrudes from the electric motor at the end away from the gear box and forms a space, sealed by a second cover, for one or more circuit boards, which carry the position phase angle sensor and of the motor phase angle sensor, as well as the electronics for detecting and processing the data of these sensors and for controlling and supplying the electric motor.

In a further embodiment of the invention, the ring magnet coaxially encloses the position magnet.

Generally, according to the present invention, the electric motor, the gearbox, the position phase angle sensor and the motor phase angle sensor are integrated in a common housing. The housing may also include the electronics for detecting and processing the signals from the phase angle sensor. In particular, the rotor shaft of the electric motor is designed as a hollow shaft, in which the drive shaft is mounted coaxially. The gearbox is arranged at one end face of the electric motor, the output shaft passing coaxially through the gearbox, and the end of the shaft which protrudes from the gear box being provided with a coupling. The drive shaft passes coaxially through the rotor of the electric motor and carries a position phase angle sensor at the second end face of the electric motor opposite the gear box. The motor phase angle sensor arranged on the rotor shaft coaxially encloses the position phase angle sensor. The scanning sensors of both phase angle sensors are arranged on a common circuit board, which also carries the electronics for detecting and processing the signals of these sensors. Thus the phase angle sensors and the respective electronics can be mounted in the housing in a compact manner. Preferably a second circuit board, carrying the control and power electronics for the motor power supply, can be integrated in the housing parallel to the circuit board carrying the sensors. Since both circuit boards are arranged parallel to the end face of the electric motor, i.e., perpendicular to the axis of the rotor shaft and the output shaft, these circuit boards add little to the overall dimensions of the housing.

The phase angle sensors may beneficially be magnetic phase angle sensors, which require little space for the units coupled to the respective shaft and for the respective sensors.

BRIEF DESCRIPTION OF THE DRAWINGS

The sole FIGURE shows an axial cross section of a positioning and actuating drive in accordance with the invention.

DETAILED DESCRIPTION OF THE INVENTION

In the following, the invention is elucidated in detail with reference to an embodiment of the invention illustrated in the drawing. The sole FIGURE shows the axial section of a positioning and actuating drive.

The positioning and actuating drive has a DC motor. The electric motor is designed with three coil windings 10 as a three-phase motor. The magnetic return of coil windings 10 is implemented through a yoke 12 and a pole tube 14, coaxially inserted in coil windings 10 and yoke 12. A permanent magnet rotor 16, mounted on a rotor shaft 18, is arranged coaxially in pole tube 14. Rotor shaft 18 is designed as a hollow shaft and mounted in a housing via roller bearings 20.

An output shaft 22 is arranged coaxially and rotatably in rotor shaft 18. Output shaft 22 is rotatably mounted via roller bearing 24 in the housing and via roller bearing 26 in rotor shaft 18. Rotor shaft 18 axially protrudes from the electric motor at its first end face, which is the left-hand end face in the drawing. Output shaft 22 in turn axially protrudes from rotor shaft 18 at its end face. Rotor shaft 18 is drivingly coupled to output shaft 22 via a gear box 28, which is preferably designed as a speed reducing gear box. Gear box 28 is designed as a toothed-coupling gear box, whose gears are mounted in the housing. Gear box 28 engages with a peripheral toothed coupling of the end of rotor shaft 18 protruding from the electric motor and also with a peripheral toothed coupling of the area of output shaft 22, which protrudes from rotor shaft 18.

On the second end face opposite gear box 28, i.e., the right-hand end face in the drawing, rotor shaft 18 protrudes from rotor 16 with a short shaft stub. A ring magnet 30 having periodically varying permanent magnet segments is pressed onto this stub of rotor shaft 18. Ring magnet 30 is scanned by Hall sensors 32, which are arranged at a small radial distance from the outer periphery of ring magnet 30. Hall sensors 32 are mounted on a first circuit board 34, which is mounted in the housing perpendicularly to the axis of rotor shaft 18 at a small axial distance from the end of rotor shaft 18.

On the second end face (on the right-hand side in the drawing), output shaft 22 ends at a small axial distance within rotor shaft 18 before its axial end. At the end face end of output shaft 22, a position magnet 36 is mounted, which is scanned by a magnetoresistive sensor 38 arranged axially upstream from this position magnet 36. This MR sensor 38 is also mounted on first circuit board 34. Position magnet 36 is enclosed in the radial direction by a shield bushing 40, which provides a shielding effect between the magnetic measuring systems of ring magnet 30 and Hall sensors 32, and those of position magnet 36 and MR sensor 38.

The magnetic measuring system of ring magnet 30 and Hall sensors 32 determines the angular position of rotor shaft 18 and thus of rotor 16 and delivers the data for commutation and power supply to coil windings 10 of the DC motor.

Position magnet 36 and MR sensor 38 deliver, depending on the design of position magnet 36 and MR sensor 30, sinusoidal signals with one or more sine periods per revolution of output shaft 22. These sinusoidal signals are interpolated in order to determine the absolute angular position of output shaft 22. The absolute position signals generated by position magnet 36 and MR sensor 38 may be digitized, and may also be added and stored, so that the angular position of output shaft 22 and of an actuator element driven by output shaft 22 can also be determined over a plurality of revolutions of output shaft 22. Thus a multi-turn absolute sensor is obtained for the position of output shaft 22.

First circuit board 34 may further comprise, in addition to Hall sensors 32 and MR sensor 38, the electronics for detecting and processing the signals and data delivered by these sensors. Furthermore, a second circuit board 42, which may carry control electronics and power electronics for the electric motor, is arranged in the housing parallel to and at an axial distance from the first circuit board 34.

The electric motor having coil windings 10 and rotor 16, gear 28, magnetic measuring systems 30, 32, and 36, 38, as well as first circuit board 34 and second circuit board 42, may be fully encapsulated and enclosed in the housing. For this purpose, the housing may have a housing tube 44, which is preferably designed and manufactured as an extruded aluminum section. This housing tube 44 accommodates the electric motor having coil windings 10. At the first end face (on the left-hand side in the drawing), a housing block 46, preferably designed and manufactured from sintered steel, is located next to housing tube 44. Housing block 46 is fitted into housing tube 44 and has an outline basically coinciding with that of housing tube 44. Housing block 46 is pot-shaped, and the bottom of the housing block facing housing tube 44 forms an inward directed flange, in which the left-hand roller bearing 20 of rotor shaft 18 is mounted. The pot-shaped inner space of housing block 46 may also accommodate gear box 28. At its open end face, facing away from housing tube 44, i.e., at the left-hand end face in the drawing, housing block 46 is sealed by a fitted first cover 48. Cover 48 has a central opening, through which output shaft 22 protrudes from the housing at the end face. The protruding end of output shaft 22 may be coupled to a positioning and actuating element. Cover 48 accommodates roller bearing 24 for rotatably mounting output shaft 22.

At the opposite second end face, housing tube 44 protrudes beyond coil windings 10 axially and forms a space, which may accommodate the magnetic measuring devices and circuit boards 34 and 42 with the respective electronics. On this right-hand end face, housing tube 44 is sealed by a second cover 50. A cable terminal 52, through which the supply lines and data lines enter the housing, is mounted on the outside of housing tube 44.

The description of preferred embodiments of the invention is not intended to be exhaustive, and other applications of the principles of the invention may be imagined by one of skill in the art. Therefore, it is intended the scope of the invention should only be limited by the following claims.

What is claimed is:

1. A positioning and actuating drive, comprising:

an electric DC motor, which has a stator and a rotor rotatably mounted coaxially in the stator;

a rotor shaft of the rotor, which is designed as a hollow shaft;

an output shaft rotatably mounted coaxially in the rotor shaft;

a gear box which drivingly connects the rotor shaft to the output shaft and is arranged at a first end face of the electric motor, the output shaft protruding outward from the rotor shaft and the gear box at the first end face;

a position phase angle sensor and a motor phase angle sensor, which are arranged at an opposite second end face of the electric motor, the position phase angle sensor having a position phase angle sensing unit mounted on the output shaft and a fixed position phase angle sensor, and the motor phase angle sensor having a motor phase angle sensing unit mounted on the rotor shaft and a fixed motor phase angle sensor;

electronics for detecting and processing signals from the position phase angle sensor and of the phase angle sensor; and a housing, which encloses the electric motor, the gear box, the position phase angle sensor, the motor phase angle sensor, and the electronics, with the output shaft protruding at an end face.

2. The positioning and actuating drive according to claim 1, wherein the position phase angle sensor has a position magnet mounted on an end face of the output shaft and a magnetoresisitive sensor arranged on a circuit board.

3. The positioning and actuating drive according to claim 1, wherein the motor phase angle sensor has a ring magnet mounted on the end face end of the rotor shaft and at least one Hall sensor mounted on a circuit board.

4. The positioning and actuating drive according to claim 1, wherein the position phase angle sensor has a position magnet mounted on an end face of the output shaft and a magnetoresisitive sensor arranged on a circuit board;

the motor phase angle sensor has a ring magnet mounted on an end face of the rotor shaft and at least one Hall sensor mounted on a circuit board; and wherein the magnetoresistive sensor and the at least one Hall sensor are arranged on a common circuit board, which also carries the electronics for detecting and processing the signals delivered by these sensors.

5. The positioning and actuating drive according to claim 1, wherein the gear box is a tooth-coupled gear, which engages the peripheral teeth of an end section of the rotor shaft protruding from the rotor and the peripheral teeth of a section of the output shaft protruding from the rotor shaft.

6. The positioning and actuating drive according to claim 1, wherein the housing includes a housing block, a housing tube and covers that seal the housing at both ends, the housing tube accommodating the electric motor, the position phase angle sensor, the motor phase angle sensor and the respective electronics, while the housing block accommodates the gear box.

7. The positioning and actuating drive according to claim 6, wherein the housing block has a pot-shaped design with its bottom adjacent to the housing tube and sealed at its open end face by a first cover.

8. The positioning and actuating drive according to claim 7, wherein the housing tube axially protrudes from the electric motor at the end face facing away from the gear box and forms a space, sealed by a second cover, for one or more circuit boards, which carry the sensors of the position phase angle sensor and of the motor phase angle sensor, as well as the electronics for detecting and processing the data of these sensors and for controlling and supplying the electric motor.

9. The positioning and actuating drive according to claim 4, wherein the ring magnet coaxially encloses the position magnet.

10. A positioning and actuating drive, comprising:
an electric motor with a coaxial rotor and stator;
a hollow rotor shaft of the rotor;
a coaxially output shaft rotatably mounted in the rotor shaft;
a gear box connecting the rotor shaft to the output shaft with the output shaft protruding outward from the rotor shaft and the gear box;
a position phase angle sensor and a motor phase angle sensor, the position phase angle sensor having a position phase angle sensing unit mounted on the output shaft, and the motor phase angle sensor having a motor phase angle sensing unit mounted on the rotor shaft;

detectors and electronics that detect and process signals from the position phase angle sensor and the phase angle sensor; and a drive housing.

11. The positioning and actuating drive of claim 10, wherein:

the position phase angle sensor comprises a position magnet mounted on an end of the output shaft and a magnetoresisitive sensor arranged on an adjacent circuit board;

the motor phase angle sensor comprises a ring magnet mounted on an end face of the rotor shaft and at least one Hall sensor mounted on the adjacent circuit board; and wherein the adjacent circuit board also includes electronics for detecting and processing the signals delivered by these sensors.

12. The positioning and actuating drive of claim 11, wherein the ring magnet coaxially encloses the position magnet.

13. The positioning and actuating drive of claim 10, wherein the electric motor is a three phase direct current motor.

14. The positioning and actuating drive of claim 10, wherein the drive housing encloses the electric motor, the gear box, the position phase angle sensor, the motor phase angle sensor, the detectors and the electronics, with the output shaft protruding at an end face.

15. A positioning and actuating drive, comprising:
an electric motor with a coaxial rotor and stator;
a hollow rotor shaft;
a coaxially output shaft mounted in the rotor shaft;
a gear box connecting the rotor shaft to the output shaft;
a position phase angle sensor and a motor phase angle sensor;
detectors and electronics that detect and process signals from the position phase angle sensor and the phase angle sensor; and
a drive housing,
wherein the position phase angle sensor comprises a position magnet mounted on an end of the output shaft and a magnetoresisitive sensor arranged on an adjacent circuit board;
the motor phase angle sensor comprises a ring magnet mounted on an end face of the rotor shaft and at least one Hall sensor mounted on the adjacent circuit board; and
wherein the adjacent circuit board also includes electronics for detecting and processing the signals delivered by these sensors.

16. The positioning and actuating drive of claim 15, wherein the output shaft protrudes outward from the rotor shaft and the gear box.

17. The positioning and actuating drive of claim 15, wherein the drive housing encloses the electric motor, the gear box, the position phase angle sensor, the motor phase angle sensor, the detectors and the electronics, with the output shaft protruding at an end face.

18. A positioning and actuating drive, comprising:
an electric motor with a coaxial rotor and stator;
a hollow rotor shaft;
a coaxially output shaft mounted in the rotor shaft;
a gear box connecting the rotor shaft to the output shaft;
a position phase angle sensor and a motor phase angle sensor;

detectors and electronics that detect and process signals from the position phase angle sensor and the phase angle sensor; and a drive housing, wherein the position phase angle sensor has a position angle sensing unit mounted on the output shaft, and the motor phase angle sensor has a motor phase angle sensing unit mounted on the rotor shaft.

19. The positioning and actuating drive of claim 15, wherein the ring magnet coaxially encloses the position magnet.

20. The positioning and actuating drive of claim 18, wherein the output shaft protrudes outward from the rotor shaft and the gear box.

* * * * *